July 7, 1970        A. R. LIEBERMAN        3,519,490

HIGH TEMPERATURE THERMAL CONTROL FOIL SHUTTER

Filed Nov. 22, 1967

INVENTOR.
ALBERT R. LIEBERMAN
BY

United States Patent Office 3,519,490
Patented July 7, 1970

3,519,490
HIGH TEMPERATURE THERMAL CONTROL
FOIL SHUTTER
Albert R. Lieberman, Baltimore, Md., assignor, by mesne assignments, to the United States of America as represented by the United States Atomic Energy Commission
Filed Nov. 22, 1967, Ser. No. 685,059
Int. Cl. G05d 23/02; G21h 1/00
U.S. Cl. 136—202                                        5 Claims

ABSTRACT OF THE DISCLOSURE

Composite heat rejection louver made of compact, non-oxidizing, series-arranged foils for maintaining a relatively uniform temperature distribution on the heat source of a radioisotope heated thermoelectric generator by selectively controlling the heat source radiation to the ambient with a high radiation view factor when open and low parasitic heat losses when closed.

BACKGROUND OF THE INVENTION

This invention was made in the course of, or under, a contract with the United States Atomic Energy Commission.

In radioisotope heated thermoelectric generators using short half-life isotopes, a need exists for selectively controlling the radiaiton to space of the diminishing heat supply from the radioactive heat source due to its radionuclide decay. Various means for temperature control have been proposed and used in Nimbus, Pegasus or elsewhere, comprising the system described in U.S. Pat. No. 3,192,069 by Vogt and assigned to the assignee of this application, wherein a blanket of thermal insulation selectively moves toward and away from a heat radiating surface forming a heat path from the source to space selectively to increase or to decrease the radiation of heat from the source to space. Heretofore, this blanket has comprised, a thick, fibrous, semi-self-sustaining material requiring bulky, heavy or complicated supporting means. Moreover, the bulk and weight of this system have reduced the radiation area or radiation view factor. It has additionally been desirable to provide an efficient heat control system for short half-life radioisotope heated generators for operation up to over 1000° F. with low parasitic heat loss at the end of the generator operating lifetime.

SUMMARY OF THE INVENTION

This invention contemplates thin cross-section, non-oxidizing, series-arranged, high temperature, metallic, heat reflecting foils forming a thin cross-section louver with efficient radiation to space when open and low parasitic losses when closed. In one embodiment, the louver comprises thin, series-arranged, palladium foils that are insulated from each other for the efficient and effective control of the radiation of heat from fuel overloads of up to 69% or more with short half-life sources, such as Po-210, Cm-242 and Ce-144 operating at temperatures of 1000° F. for more. In another aspect, the shutter of this invention has low parasitic losses and heat conduction characteristics when closed and a high radiation view factor when open. With the proper selection of elements and materials as described in more detail hereinafter, the desired temperature control is achieved.

The above and further novel features will appear more fully from the following detailed description of this invention when the same is read in connection with the accompanying drawings. It is to be expressly understood, however, that the drawings are not intended as a definition of the invention but are for the purpose of illustration only.

BRIEF DESCRIPTION OF THE DRAWINGS

In the drawings where like elements are referenced alike.

DESCRIPTION OF THE PREFERRED EMBODIMENTS

This invention is useful in a vehicle having a short-lived radioisotope heated thermoelectric generator for manned or un-manned space operation wherein a suitable rocket engine propels the pay-load into a space ambient into which large excess heat from a radioisotope heat source above 1000° F. passes to space during the initial stage of the mission operation and as this excess heat decreases due to the radionuclide decay of source during the progress of the mission, an active thermal control system operates to reduce the heat flow to space so as to maintain a relatively constant heat flow to the generator above 1000° F. by controlling the fuel block temperature in the generator with low end-of-operating lifetime heat leakage due to parasitic heat losses. This permits a fuel overload of 69% or more in the source while avoiding the difficulty of dumping excess heat through temperature limited thermoelements. Also, this active control system functions as an emergency heat dump in the event that the thermoelements lose their ability to function normally.

Figure 1:
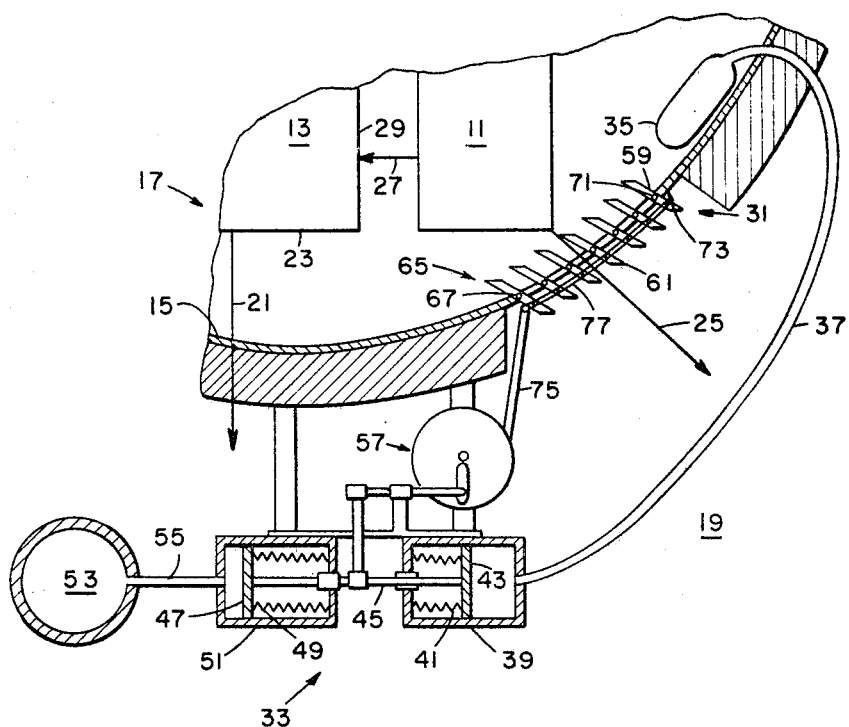
FIG. 1 is a partial cross-section of a space vehicle incorporating the temperature control louver of this invention.

Referring to FIG. 1, radioisotope source 11 in proximity to thermoelectric assembly 13 produces a temperature gradient across the assembly 13 and a corresponding electrical output from assembly 13 for use in shell 15 of space vehicle 17. As is well known, this temperature gradient depends on the total heat flow from source 11 through assembly 13 to ambient 19. By controlling the heat flow, represented for convenience by arrow 25 from source 11 to ambient 19, a substantially constant heat flow, represented for convenience by arrow 27, is maintained between source 11 and hot plate 29 of assembly 13 to provide the desired electrical output from assembly 13.

Advantageously, the heat flow represented by arrow 25 from source 11 to ambient 19 is controlled by a shutter 31 having a suitable control mechanism 33. To this end the control mechanism 33, comprises a temperature sensing reservoir 35 containing a working fluid connected by a tube 37 to an active pressure cylinder 39 containing an active pressure bellows 41 and a first piston 43. The first piston attaches by a common shaft 45 to a second piston 47 having a gas actuated bellows 49 disposed within a gas cylinder 51 connected with a constant pressure gas reservoir 53 by a connecting tube 55. A linkage and gear system 57 transmits movement of common shaft 45 to the movable shutter 31.

Figure 2:
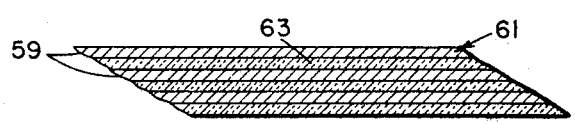
FIG. 2 is a partial enlarged view of one of the louvers of FIG. 1.

Referring to FIG. 2, in accordance with this invention shutter 31 comprises highly reflective series arranged foils 59 forming louvers 61 having a high radiation view factor when open due to their thin cross-section. Also, these foils 59 are advantageously palladium, since without a thick blanket of fibrous insulation the palladium has a measured thermal emissivity of less than 0.1 below 1600° F. and less than 0.2 up to 2300° F. This compares with gold, which no longer acts as a reflector above approximately 1200° F. and has an emissivity of greater than 0.90 above about 1300° F. This property is directly related to the fact that gold is a reflector primarily only in the infra-red and near infra-red region of the spectrum and is a poor reflector in the visible region of the spectrum, whereas palladium has high reflectivity over a wide band of radiation wave lengths, comprising the infra-red, near infra-red, and visible regions.

The palladium shutter foil 59 of this invention, moreover, is nonoxidizing in air whereby the high emissivity properties thereof remain constant even at high temperatures thus to avoid the requirements of hermetic sealing in a canister or coating with a low emissivity, oxidation resistant material. Titanium, tantalum, copper, aluminum and nickel, in contrast, are susceptible to changes in their emissivity and other properties due to oxidation.

Additionally, palladium provides a malleable material that can be made into foils 59. This compares with rhodium, which is not malleable and is not, therefore, available in foil form. Moreover, rhodium plated nickel requires an optically smooth nickel surface, which is not attainable on nickel foil. Also, such a plating process involves complicated electroplating and optimization of many process variables for achieving maximum mirror reflectivity. Additionally, for high temperature operation, the thin coatings, e.g., 5–7 microinches, still involve problems of oxidation of the substrate material either through the coating or, since the electrode used in the plating process leaves a bare spot that must be protected, through the bare spot. Also, palladium foil is far cheaper than platinum, which typically costs about $150 per troy ounce, and below 2000° F. is superior in reflectivity to platinum. Palladium moreover, is readily available in large quantities in 4 inch wide foil strips, essentially pin-hole free, at thicknesses of 1.5 to 2.0 mils and with a purity of 99.8%, the impurities being Au, Ir, Ag and Cu. Commercially available palladium foil can thus be used to insulate the high temperature source 11 by reducing its radiation component 25. Moreover, conduction is minimized by using thin cross-section readily available spacers 63 between the foils 59, comprising, for example, quartz fiber paper, alumina and ceramic coatings on one side of the foils, and by employing suitable support structure to minimize metallic conduction. To this end the support structure 65, attaches pins 67 in the middle of louver blades 61 that insert into holes 71 in the sides of a cut-out portion 73 of shell 15 so that shutter 31 extends across openings 73 and the blades thereof rotate therein around an axis through pins 67 to open and shut the shutter 31. Also, the blades 61 are rotated in parallel by gear train 57 and arms 75 and 77. To this end the arm 75 connects with linkage 77 between the louver blades 61 to open and shut shutter 31 when arm 75 is actuated by control 33.

In operation a sequence will be described in which shutter 31 is in an open position and slowly closes to maintain a uniform temperature gradient across assembly 13. Initially heat flows 27 and 21 result in a gradient across assembly 13 and a corresponding electrical output from assembly 13. As the radionuclide decay of source 11 tends to reduce the heat flows 27 and 21, vapor in the working fluid within temperature sensing reservoir 35 in shell 15 condenses until the active pressure system reaches the vapor pressure corresponding to the lower temperature. The force acting on the second piston 47 due to gas reservoir 53 and spring force in bellows 49 and 41 is greater than the force acting on the first piston 43 due to the working fluid vapor pressure. The piston common shaft 45 thus moves in the direction of the active pressure cylinder 39 until these forces equalize. Meanwhile, motion of the piston common shaft 45 toward active pressure cylinder 31 transmits through the mechanical linkage and gear train 57, and transforms linear motion to rotational motion, which pivots shutter louvers 61 through arm 75 and linkage 77, causing shutter 31 to move to a more closed position. This thereby decreases heat flow 25 from source 11 to ambient 19 through shutter 31 so as to maintain heat flows 27 and 21 at their initial level and a uniform electrical output from assembly 13. Thereafter, this operation continues to close shutter 31 in correspondence with the radionuclide decay of source 11 until the shutter closes at the end of the mission operating lifetime of vehicle 17, at which time the vehicle may be recovered from space by conventional means for examination, salvage or reuse. In the case of an adventitious increase in temperature inside shell 15, the described system also operates to open the shutter 31 to prevent destructive escalation of the temperature gradient across assembly 13 and the temperature on assembly 11.

As an example of how the shutter of this invention compares with the thick thermal insulation systems known heretofore, a comparison can be made of one-inch thick Min-K insulation with a thermal flux of around 60–70 watts/ft.$^2$ for a hot side temperature of 1473° F. The weight of a Min-K 2000 material one inch thick is 1.67 lb./ft.$^2$ of area. This compares with a palladium foil having a determined emissivity of 0.09 at 1300° F. (an effective emissivity of 0.05). Even with this value and a design factor of 2.4, 10 foils in series result in a thermal flux at least as good as the Min-K material. With 0.01 inch foil, including spacing, the entire shutter is only 0.10 inch thick as compared to the Min-K thickness of one inch and would weigh only 0.92 lb./ft.$^2$ of area. Moreover, on an equal weight basis (about 18 foils), the foil shutter thermal flux is about 45 watts/ft.$^2$, and would be only 0.18 inch thick compared to a one-inch Min-K thickness, which would have a thermal flux of 60 to 70 watts/ft.$^2$.

This invention has the advantage of providing a simple, effective and efficient control of heat flow from a high temperature radioisotope short half-life heat source to a space environment with an initial high radiation view factor and subsequent low parasitic heat losses from heat conduction or otherwise. Actual measurements have shown this invention to provide high efficiencies at up to 1000° F. and over. Moreover, the system of this invention is compact, light in weight, and operates simply, efficiently and in a trouble free manner over large temperature ranges.

What is claimed is:

1. A high temperature, short half-life radioisotope heated thermoelectric generator system for operation in a space ambient, having a radioisotope heat source and a heat flow control system, said heat flow control system comprising series arranged, parallel, spaced apart, thin cross-section, palladium foils forming selectively rotatable louver blades having flat parallel sides for rotating in one direction to an open mode to form a direct path from said source to the ambient between said blades along the sides thereof to provide high heat flow from said source to the ambient, an for rotating in the opposite direction to a close mode to block said direct path by interposing said series arranged parallel foils in said direct path thereby to increase the heat flow through a heat flow resistant path formed by said foils and to decrease the heat flow in said direct path between said blades to insulate said heat source by reducing the heat flow from said source to the ambient.

2. The invention of claim 1 in which said series arranged foils have thin-thermal insulation sandwiched therebetween.

3. The invention of claim 1 in which said louver blades, comprise series arranged palladium foils four inches wide having a thickness from 1.5 to 2.0 mils and a purity of 99.8% palladium having thin low heat conductivity spacers sandwiched therebetween to provide a high radiation view factor when said louver blades are open and low heat loss when said louver blades are closed.

4. The invention of claim 1 in which said louver blades rotate in said one direction to radiate heat directly to said ambient and rotate in said opposite direction substantially completely to close said louver blades against each other substantially to prevent the radiation of heat to said ambient along the sides of said louver blades.

5. The invention of claim 1 having means for selectively rotating said louver blades in parallel to maintain a uniform, constant temperature gradient across said electrical power producing system in correspondence with the radionuclide decay of said source.

References Cited

UNITED STATES PATENTS

| 3,192,069 | 6/1965 | Vogt et al. | 136—202 |
| 3,362,467 | 1/1968 | Kummerer | 165—32 |

CARL D. QUARFORTH, Primary Examiner

H. E. BEHREND, Assistant Examiner

U.S. Cl. X.R.

165—32, 96